United States Patent
Muntada Roura

(10) Patent No.: US 9,818,268 B2
(45) Date of Patent: Nov. 14, 2017

(54) MOTOR VEHICLE WITH INDICATION OF A STATE OF CHARGE OF AN ENERGY STORAGE DEVICE

(71) Applicant: Audi AG, Ingolstadt (DE)

(72) Inventor: Cesar Muntada Roura, Pfaffenhofen an der Ilm (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/421,396

(22) PCT Filed: Jul. 11, 2013

(86) PCT No.: PCT/EP2013/002046
§ 371 (c)(1),
(2) Date: Feb. 12, 2015

(87) PCT Pub. No.: WO2014/026725
PCT Pub. Date: Feb. 20, 2014

(65) Prior Publication Data
US 2015/0243141 A1  Aug. 27, 2015

(30) Foreign Application Priority Data

Aug. 14, 2012 (DE) .......................... 10 2012 016 040

(51) Int. Cl.
*B60Q 1/00* (2006.01)
*G08B 5/38* (2006.01)
(Continued)

(52) U.S. Cl.
CPC ............ *G08B 5/38* (2013.01); *B60L 11/1816* (2013.01); *B60L 11/1861* (2013.01); *B60Q 1/38* (2013.01);
(Continued)

(58) Field of Classification Search
CPC .... G08B 5/38; B60L 11/1816; B60L 11/1861; B60L 2250/16; B60Q 1/38; B60Q 1/50;
(Continued)

(56) References Cited

U.S. PATENT DOCUMENTS 5,455,485 A * 10/1995 Kutter ...................... B62J 6/003
                                                            310/37
5,757,595 A   5/1998 Ozawa et al.
(Continued)

FOREIGN PATENT DOCUMENTS

CN   101830201 A   9/2010
CN   202243181 U   5/2012
(Continued)

OTHER PUBLICATIONS

International Search Report issued by the European Patent Office in International Application PCT/EP2013/002046.
(Continued)

*Primary Examiner* — Zhen Y Wu
(74) *Attorney, Agent, or Firm* — Henry M. Feiereisen LLC

(57) ABSTRACT

A motor vehicle includes an energy storage device which can be charged by connecting a charge cable to a vehicle-sided terminal device, and an optical lighting device which indicates the ongoing charging process or at least the complete charge status of the energy storage device. A blinker light provided on the side of the vehicle on which the terminal device is located, is used as lighting device.

8 Claims, 1 Drawing Sheet

(51) Int. Cl.
- *B60Q 1/38* (2006.01)
- *B60Q 1/50* (2006.01)
- *B60L 11/18* (2006.01)
- *H02J 7/00* (2006.01)

(52) U.S. Cl.
CPC .............. *B60Q 1/50* (2013.01); *H02J 7/0047* (2013.01); *B60L 2250/16* (2013.01); *H02J 2007/0049* (2013.01); *Y02T 10/7005* (2013.01); *Y02T 10/705* (2013.01); *Y02T 10/7044* (2013.01); *Y02T 10/7072* (2013.01); *Y02T 90/14* (2013.01)

(58) Field of Classification Search
CPC ............ H02J 7/0047; H02J 2007/0049; Y02T 10/7005; Y02T 10/7044; Y02T 10/705; Y02T 10/7071; Y02T 90/14
USPC .......................................................... 340/455
See application file for complete search history.

(56) References Cited

U.S. PATENT DOCUMENTS

| | | | | |
|---|---|---|---|---|
| 7,417,534 B2* | 8/2008 | Quach | ...................... | B60Q 1/34 340/468 |
| 7,999,665 B2 | 8/2011 | Chander et al. | | |
| 9,457,791 B2* | 10/2016 | Vitale | ................... | B60L 3/0069 |
| 9,475,400 B2* | 10/2016 | Hooker | ................ | B60L 3/0046 |
| 9,610,851 B2* | 4/2017 | DeBoer | ............... | B60L 11/1824 |
| 2001/0028565 A1* | 10/2001 | Ishida | ................... | B60Q 1/085 362/464 |
| 2006/0091817 A1* | 5/2006 | Herrig | ..................... | B60Q 1/34 315/200 A |
| 2009/0021364 A1* | 1/2009 | Frey | ...................... | B60L 3/0069 340/468 |
| 2010/0140244 A1 | 6/2010 | Chander et al. | | |
| 2012/0161956 A1 | 6/2012 | Grundmann et al. | | |
| 2012/0179318 A1* | 7/2012 | Gilman | ............ | B60W 50/0097 701/22 |
| 2014/0197955 A1* | 7/2014 | Martin | ..................... | G08B 5/36 340/584 |

FOREIGN PATENT DOCUMENTS

| | | |
|---|---|---|
| DE | 10 2007 028 386 A1 | 1/2009 |
| DE | 10 2003 044 741 A1 | 6/2010 |
| DE | 10 2010 008 334 A1 | 8/2011 |
| DE | 10 2010 017 759 A1 | 1/2012 |
| DE | 10 2010 037 514 A1 | 3/2012 |
| DE | 10 2010 055 797 A1 | 6/2012 |
| JP | 2003 235 111 A | 8/2003 |
| WO | WO 2010 130 743 A2 | 11/2010 |

OTHER PUBLICATIONS

Chinese Search Report issued by the Chinese Patent Office in counterpart Chinese application No. 201380042993.2 dated Apr. 21, 2016.

Translation of Chinese Search Report issued by the Chinese Patent Office in counterpart Chinese application No. 201380042993.2 on Apr. 21, 2016.

* cited by examiner

MOTOR VEHICLE WITH INDICATION OF A STATE OF CHARGE OF AN ENERGY STORAGE DEVICE

CROSS-REFERENCES TO RELATED APPLICATIONS

This application is the U.S. National Stage of International Application No. PCT/EP 2013/002046, filed Jul. 11, 2013, which designated the United States and has been published as International Publication No. WO 2014/026725 and which claims the priority of German Patent Application, Serial No. 102012016040.2, filed Aug. 14, 2012, pursuant to 35 U.S.C. 119(a)-(d).

BACKGROUND OF THE INVENTION

The invention relates to a motor vehicle, including an energy storage device chargeable through connection of a charging cable to a vehicle-mounted terminal device, and an optical lighting device indicating the ongoing charging process or at least the full state of charge of the energy storage device.

Vehicles with electric drive, be it hybrid vehicles with a combination of an internal combustion engine and an electric motor with associated energy storage device, or be it purely electric vehicles, are known. They have in common the presence of an energy storage device, i.e. a sufficiently receptive and powerful accumulator which is able to store energy that can be drawn, if need be, to drive the motor vehicle.

The energy storage device has to be charged from time to time, which normally is realized by connecting a charging cable to a vehicle-mounted terminal device. The charging cable, which is run from a household outlet to the terminal device that is normally located on the vehicle side, or from a corresponding specially provided charging station at a gas station, is plugged into the vehicle-mounted terminal device so that the charging process can begin. To signal the user that the charging process is in progress, a lighting device, such as a small LED or the like, may, for example, be provided adjacent to the terminal device to visualize this by a light signal. Also the state of charge, i.e., for example, that the charging process is complete, because the energy storage device is fully charged, can be indicated. This requires, however, separate provision of an appropriate indicating device in the form of LEDs or the like on the vehicle side, requiring the integration of LEDs and a corresponding line routing etc.

SUMMARY OF THE INVENTION

The invention is thus based on the problem to provide a motor vehicle which enables in the absence of a particular, additional lighting device a signaling of an ongoing charging process and/or a state of charge of the energy storage device in a simple manner.

This problem is solved according to the invention by a motor vehicle of the type mentioned above by providing a blinker light as a lighting device on the vehicle side on which the terminal device is located.

According to the invention, an anyway already installed blinker light on the vehicle side is used to signal the one or preferably both respective actions and corresponding states. This blinker light easily enables issuance of corresponding light signals, when the charging cable is connected and the charging process is in progress or the energy storage device is, for example, fully charged. The flashing operation is controlled via a suitable control device which, when the vehicle is turned off and the connection of the charging cable to the terminal device is detected, is switched to a corresponding mode of operation in which the blinker light is respectively activated while the charging cable is connected.

Thus, it is possible to establish the respective visualization without installing additional indicating devices or lighting elements, etc., but rather using already existing elements.

It is hereby advantageous in accordance with a refinement of the invention, when the blinker light is able to indicate the ongoing charging process by a first light signal and to indicate the state of charge, i.e., for example, the realization of the full state of charge, by a different second light signal. Using the blinker light thus permits the provision of at least two different light signals, which is easily possible by corresponding activation of the lighting elements provided in the blinker light. The ongoing charging process is indicated, for example, by rhythmical flashing while the indication of, for example, the full charge is visualized by a continuous light signal. An appropriate activation of the blinker light can easily be realized by using the associated control unit. Basically, it is even possible to visualize the realization of the full state of charge during the ongoing indication process by changing the flashing frequency. When, for example, the energy storage device is fairly empty, the blinker light flashes at relatively low frequency. As the charging process progresses and thus the stored energy increases, the flashing rate can increase, until the full state of charge is reached, at which time the lighting device remains constantly lit.

In addition or as an alternative to the variation between a flashing signal and a constant light signal, it is also conceivable to distinguish the different light signals by the color of light. Thus, it is conceivable, for example, to provide via the blinker light a first light signal in red color to visualize the ongoing charging process. The second light signal can, for example, be provided in green light color to signal the full state of charge.

It is conceivable, for example, to emit during the charging process a flashing signal in red light color, whereas a full state of charge is visualized by constant illumination with green light color. Thus, the different signals are diversified in terms of both frequency and the light color.

In order to indicate to the user, after completion of charging process and disconnection of the charging cable, that the blinker light, including the blinker light control, has returned again to "normal mode", which it has exited during the charging process as described in order to issue the corresponding light signals, an advantageous refinement of the invention provides for the issuance of a third light signal, as the charging cable is disconnected, to signal the normal operating mode of the blinker light. This third light signal is emitted, for example, in the color of light at which the flashing signals generated during normal operation are emitted. This means that this third light signal is thus yellow or orange, just like the blinker light in normal operation, when issuing direction signals.

This means that ultimately three different signals are issued, namely a first signal relating to the ongoing charging process, a second signal relating to the state of charge, for example, the full state of charge, and a third signal relating to the transition of the blinker light control in the normal mode.

For issuance of light signals, it is suitable to provide one or more four-color LEDs or RGB LEDs in the blinker light.

Such four-color LEDs or RGB LEDs are capable to easily issue all light signals, since they enable the generation of either discrete different colors or combinations of random colors in the case of the RGB LEDs. This means that such LEDs can be used to issue the much more frequently needed "normal" orange or yellow flashing signals as well as also the other signals in the desired light color during execution of the charging process. When no color variation is provided within the signals to be issued, the use of plain white LEDs or white lighting elements may, of course, also be possible, in which case the respective three light signals then differ only in the respective frequency.

BRIEF DESCRIPTION OF THE DRAWING

Further advantages, features and details of the invention will become apparent from the exemplary embodiment described hereinafter as well as with reference to the drawing. It is shown in.

DETAILED DESCRIPTION OF PREFERRED EMBODIMENTS

Figure 1:
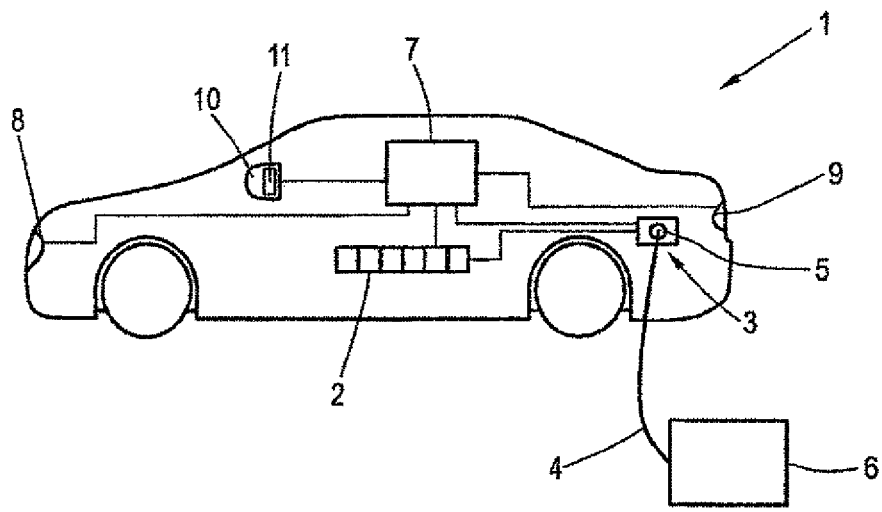
FIG. 1 the principal illustration of a motor vehicle according to the invention, FIG. 2 a principal illustration for the operation of the blinker light during the ongoing charging process, FIG. 3 a principal illustration for the operation of the blinker light, when the full state of charge has been reached, and FIG. 4 a principal illustration for the operation of the blinker light, when the charging cable is disconnected.

FIG. 1 shows a motor vehicle 1 according to the invention, including an energy storage device 2 in the form of a suitably sized accumulator and a charging port device 3 to which in the exemplary embodiment shown here a charging cable 4 is connected via a suitable plug 5. The charging cable 4 is connected to a power source 6, not shown in greater detail, so that the energy storage device 2 can be charged via the charging cable 4.

Further provided is a control device 7 for controlling the lighting operation of various blinker lights, namely the front blinker light 8, the rear blinker light 9, and the side blinker light 11 located in the side mirror 10. The control device 7 further communicates (directly or indirectly via other control devices which are not shown here in greater detail) with the energy storage device 2 and receives corresponding information about the state of charge of the energy storage device 2, i.e. whether the latter is charged only partially or completely. The control device communicates further with the charging port device 3 and can ascertain whether a charging cable 4 is attached and a charging process is in progress.

The control device 7 now signals to the user in conjunction with at least one of the blinker lights 8, 9 or 11, that the charging process is in progress and/or that the full state of charge is detected, and it is also, optionally, possible to visualize to the user that after completion of the charging process, when the charging cable 4 is disconnected, the blinker lights, including the control device 7, return to the normal mode, in which the normal, typical flashing operation can take place.

Figure 2:
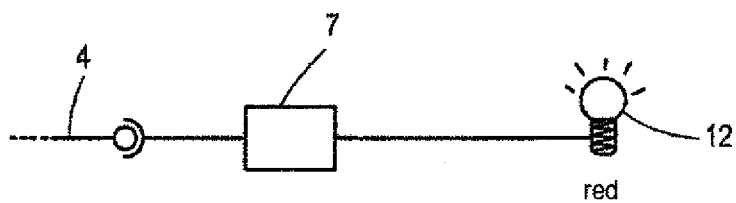

FIG. 2 shows a principal illustration of the situation in which the charging cable 4 is plugged into the charging port device 5, since the energy storage device 2 is not full; the charging process is in progress. The control device 7 has detected the connection of the charging cable 4, which automatically results in a change to an appropriate indication mode by causing at least one of the blinker lights 8, 9 or 11 to issue corresponding light signals to inform the user. The control device further queries continuously the state of charge of the energy storage device 2 so as to know the percentage of how much the energy storage device 2 is charged.

Immediately with the start of the charging process, the control device 7 activates a respective lighting element 12 of one of the blinker lights 8, 9 or 11, for example, the blinker light 11 located in the side mirror 10, so that a first light signal is issued. The lighting element 12, shown here as symbolized light bulb, flashes hereby. The lighting element 12 preferably involves an LED, preferably an RGB LED, which allows the combination of random colors. The light color, in which this light signal is emitted to visualize the ongoing charging process, is red in the illustrated exemplary embodiment. This means that as long as the charging process is in progress, i.e. the energy storage device 2 is not yet fully charged, the light element 12 of the blinker light 11 flashes red for example. The frequency can be constant, but may also increase as the degree of charging of the energy storage device 2 increases, i.e. flashing becomes slightly faster to indicate to the user that the end of charging process is near.

Figure 3:
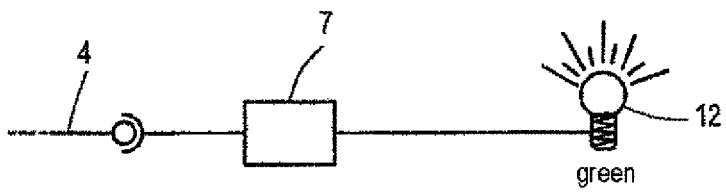

Once the full state of charge has been reached, the type of the light signal, issued by the lighting element 12, changes from the first light signal shown in FIG. 2 to a second light signal shown in FIG. 3. The control device 7 detects the full state of charge of the energy storage device 2. Concurrently with detection, the control device 7 activates the respective lighting element 12, i.e., for example, the RGB LED, so that a constant light signal is issued, i.e. the lighting element 12 is lit continuously, and furthermore a switchover to a second light color, here green, is implemented. This solid green light signals to the user that the charging process is now complete.

Figure 4:
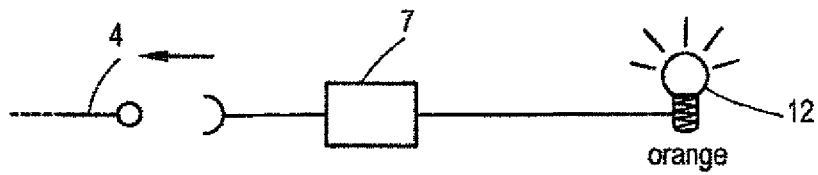

Finally, FIG. 4 shows the situation, when, after successfully completing charging, the charging cable 4 is disconnected, as shown by the arrow. The control device 7 immediately detects the removal of the charging cable 4. This detection causes it to change back again to the normal "blinker light operating mode" in which the blinker lights 8, 9 and 11 emit respective direction signals, when the blinker lever is actuated. To signal this to the user, i.e. that the "charge indicator mode" has been exited, the lighting element 12 is respectively activated by the control unit 7 for a third time. For example, the control device, after causing previously the issuance of a constant green light signal, now issues again a flashing signal with orange light color. This means that the lighting element 12 lights up briefly, for example, three times or five times and intensely orange to signal to the user that the control device 7 again assumes the normal flashing mode.

In the event, the charging cable 4 is disconnected before the full state of charge has been reached, the control device 7 would change from the operating mode shown in FIG. 2, in which the ongoing charging process is visualized by emitting a red flashing light, immediately to the issuance of an orange flashing light which is emitted only a few times and shown in FIG. 4, i.e. the state shown in FIG. 3, since not realized, is skipped.

Of course, it is conceivable to issue the corresponding signals not only via one of the blinker lights 8, 9 or 11, but at the same time via all of them. The lighting elements provided there would thus all light up in synchronism and at the same frequency, and with the same color, depending on the type of light signal to be issued.

Thus, the signaling elements that already exist anyway on the vehicle, namely the built-in blinker lights, are used. By equipping them with LEDs that generate respectively different colors, the corresponding changes in color can easily be implemented.

In the event that no color LEDs are installed, but simple white or orange lighting elements, the diversification of the individual different signals, described in FIGS. 2-4 can be realized solely via the light frequency. For example, indication of the ongoing state of charge according to FIG. 2 can be realized with relatively low flashing rate. The indication of the full state of charge can be realized with a steady light. The indication of a change from the "charging indication mode" again to the normal "flashing mode", as implemented by the control device 7, can be visualized by very intense flashing with very short flashing frequency.

The invention claimed is:

1. A motor vehicle, comprising:
an energy storage device chargeable through connection of a charging cable to a vehicle-mounted terminal device; and
an optical lighting device constructed to indicate an ongoing charging process or at least a full state of charge of the energy storage device, said optical lighting device being adapted to issue a first light signal to indicate the ongoing charging process, and a different second light signal to indicate the full state of charge, when the charging cable is connected, and also a third light signal to indicate a normal flashing operating mode of the optical lighting device non-related to the charging process, when the charging cable is disconnected,
said optical lighting device configured as an external blinker light outside the motor vehicle issuing direction signals on a side of the motor vehicle, which optical lighting device is configured to issue the first light signal indicative of the ongoing charging process, the second light signal which is indicative of the full state of charge, and the third light signal non-related to the charging process which is a directional flashing signal of a normal typical flashing operation of the blinker light of the motor vehicle, so that no additional optical lighting device is needed to indicate the ongoing charging process or at least the full state of charge of the energy storage device.

2. The motor vehicle of claim 1, wherein the first signal is a flashing signal and the second signal is a constant light signal.

3. The motor vehicle of claim 1, wherein the first and second light signals differ in the color of light.

4. The motor vehicle of claim 3, wherein the first light signal has a red light color and the second light signal has a green light color.

5. The motor vehicle of claim 1, wherein the third light signal has a color of light which corresponds to a light color of a flashing signal generated by the blinker light in the normal operating mode.

6. The motor vehicle of claim 1, wherein the blinker light includes one or more four-color light-emitting diodes or red-green-blue light-emitting diodes for issuance of the first and second light signals.

7. The motor vehicle of claim 1, wherein said optical lighting device simultaneously configured as the blinker light of the motor vehicle issues the first light signal indicative of the ongoing charging process and having a changing flashing frequency during the ongoing charging process.

8. The motor vehicle of claim 1, wherein said optical lighting device simultaneously configured as the blinker light of the motor vehicle issues the first light signal indicative of the ongoing charging process and having a changing flashing frequency during the ongoing charging process such that when the energy storage device is fairly empty the blinker light flashes at a relatively low frequency and as a charging process progresses and stored energy increases the flashing rate increases.

* * * * *